May 17, 1955 O. H. SCHMITT 2,708,749

PANORAMIC TRANSPONDER

Filed July 9, 1945

INVENTOR.
OTTO H. SCHMITT
BY
William D. Hall,
ATTORNEY 2,708,749

PANORAMIC TRANSPONDER

Otto H. Schmitt, Port Washington, N. Y., assignor to the United States of America as represented by the Secretary of War Application July 9, 1945, Serial No. 604,063

5 Claims. (Cl. 343—6.8)

This invention relates to communication systems and more particularly to such systems designed to transmit a predetermined signal upon reception of a signal.

According to the invention, a tuner is caused to sweep cyclically across the assigned frequency band. When the tuner is tuned to an incoming signal, its output causes a suitable device to activate a quiescent transmitter (inoperative or operative at a low level) the frequency of which is determined by the tuner. Transmitter operation is restricted to a brief pulse and the receiving device is rendered insensitive or ineffective during this pulse. The tuning proceeds during transmitter operation and, following the transmitted pulse, will be effective to cause renewed transmitter operation when a signal is encountered at some other point in the assigned frequency range, and likewise when a signal is encountered again at the frequency of the first-mentioned incoming signal during a succeeding sweep of the tuner.

For a better understanding of the invention, reference is made to the following detailed description and to the drawing, in which.

Figure 1:
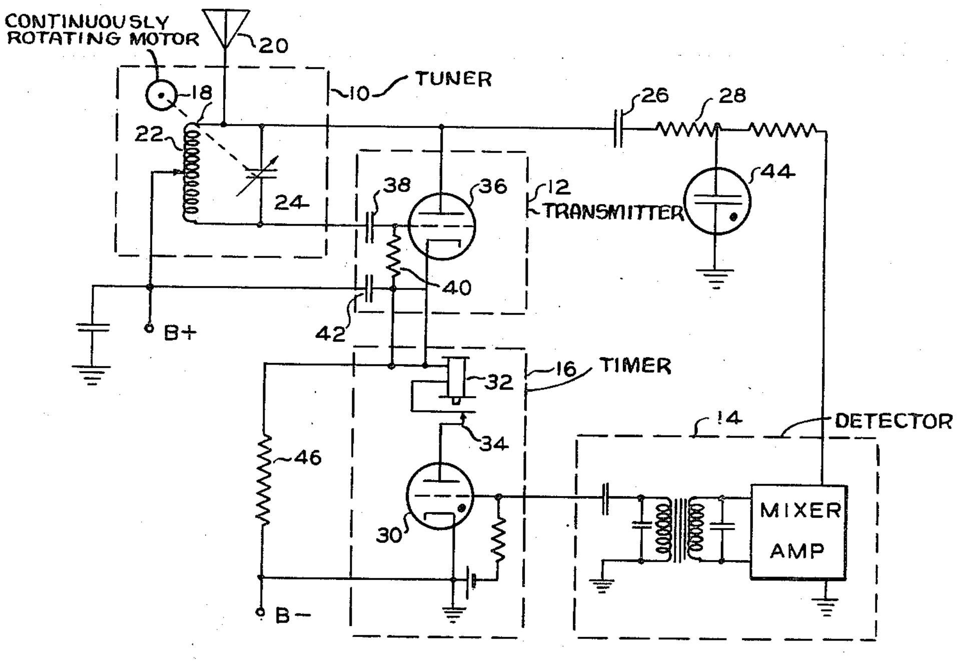
Fig. 1 is a schematic diagram of a preferred embodiment.

In Fig. 1, rectangle 10 represents a tuner, rectangle 12 a transmitter, rectangle 14 a signal-detecting means, and rectangle 16 a timing device for the transmitter. Antenna 20 is effective in this embodiment of the invention for both receiving and transmitting operations. Tuner 10 is here constructed merely with a coil 22, tapped to supply high voltage to tube 36, and a variable capacitor 24 which is arranged to be rotated by a motor 18 at any desired speed. Tube 36 normally operates with tuner 10 and other elements, to be described presently, as an oscillator at a low power level. Beat-frequency voltage resulting from the combination of the oscillator output and the input from antenna 20 is impressed on the signal detector 14 through a blocking capacitor 26 and a resistor 28, the purpose of which will be explained hereinafter. Detector 14 may consist of a mixer-amplifier peaked to respond to low beat-frequencies; hence, the response of device 14 to a particular incoming signal occurs a short time before the frequency of oscillator 12 actually coincides with the signal frequency. The output of detector 14 is impressed on thyratron 30 so as to render it conductive. The plate of thyratron 30 is energized by a positive voltage source through a series circuit comprising relay 32, having contacts 34, and tube 36. Grid excitation for tube 36 is furnished by the tank circuit of tuner 10 through a capacitor 38, and grid bias is developed in the resistor 40. Capacitor 42 is for by-pass purposes. Resistor 46 is relatively high in value and is in the negative return circuit for the oscillator 36 when operating at low level.

In operation, when a signal is received and thyratron 30 fires, the cathode of tube 36 is suddenly connected through the low-resistance thyratron circuit to B—, causing the oscillator to operate at a high power level. Relay 32 is arranged to afford a time delay in opening its contacts 34, thus allowing a pulse of power oscillator operation, after which delay the tube 36 is returned to its quiescent state. During the delay afforded by relay 32, the tuner sweeps past the frequency of the detected signal. During this operation the radio frequency transmitter voltage, which might otherwise be impressed on detector 14, is prevented from damaging the latter by a neon tube 44 or like device adapted to break down momentarily and become a substantial short-circuit for an excessive value of input voltage. Resistor 28 prevents appreciable drain of transmitter power, and capacitor 26 blocks the high direct current voltage.

The change in tuning of the tank circuit comprising coil 22 and capacitor 24 proceeds uninterruptedly, and the process described above is repeated for each received signal. Since the traverse of the predetermined frequency band is continuous, each of the signals will be responded to in the next and each succeeding traverse of the tuning system. The beat-frequency to which device 14 is responsive is made low, so that the transmitter power burst may be brief and very high in power relative to the average power rating, and a proper transmitter timer is used to prevent double transmitter bursts for each received signal. Properly designed systems will concentrate their transmitted power close to the center frequency of the incoming signals.

Figure 2:
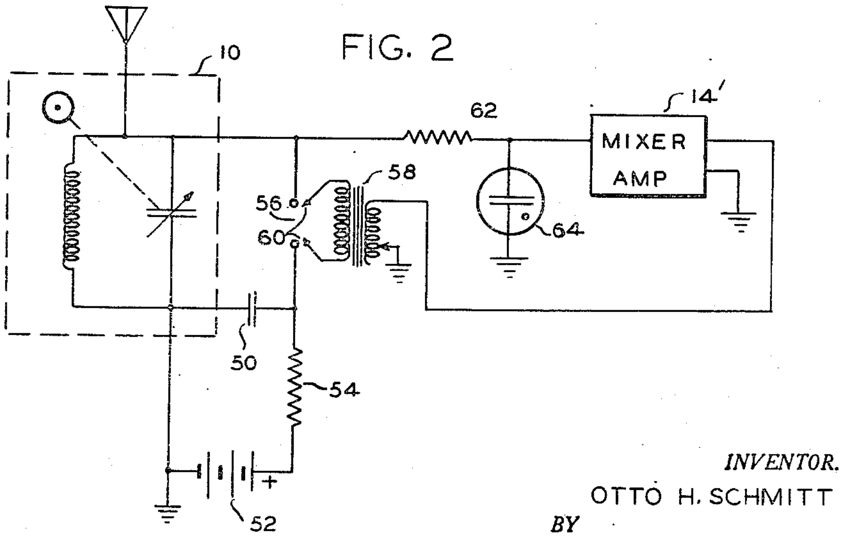
Fig. 2 is a schematic diagram of another embodiment of the invention.

It will be evident that there are many variations of this apparatus. For example, referring to Fig. 2, an elementary but effective form involves a capacitor 50 charged from a high-voltage source 52 through a resistor 54 to replace the transmitter 12 and the timer 16 in Fig. 1. The capacitor may be coupled to the tuner 10 through a spark gap 56. The output of signal detector 14' (responsive to radio frequency carriers whether modulated or not) is fed to a high-voltage induction coil 58, the spark output of which at discharge points 60 ionizes the atmosphere in spark gap 56 so that tuner 10 then constitutes a part of a tuned spark transmitter. Recharging of the capacitor 50 in time to respond to its own pulsed transmission is prevented by resistor 54 in series with its power supply. A resistor 62 and gas discharge device 64 may be arranged to protect detector 14'.

In another form of this apparatus, successfully operated with a vacuum-tube type of transmitter, the period of transmitter operation was limited by the charging of a capacitor in series with the transmitter tube rather than by relying on mechanical time-delay as in the embodiment of Fig. 1.

The tuner may involve separate resonant circuits for the transmitter and receiver portions of the system, mechanically ganged, and may even be electronically rather than mechanically tuned over its range. The signal detector may be designed for response to only modulated signals, or to all types of signals. Further modifications of the invention will occur to those skilled in the art.

What is claimed is:

1. An apparatus for transmitting a predetermined signal in response to a received signal comprising receiving means, transmitting means, said transmitting means normally producing a low power output, means for continuously and cyclically varying the frequency of said transmitting means over a predetermined frequency range, mixer means associated with said receiver means and said transmitting means in such a manner as to produce an output when the outputs of said receiver and transmitting means differ in frequency by a predetermined amount, and means associated with the output of said mixer means in such a manner as to increase the output of said transmitting means for a predetermined time after the occurrence of the output from said mixer means.

2. A radio device including receiving and quiescent transmitting means coordinately tunable through a predetermined frequency range, means for cyclically and continuously tuning said device through said range, and means initially controlled by said receiving means for pulsing said transmitter upon detection of a signal in said range.

3. A radio device including receiving means and normally quiescent transmitting means tunable together through a predetermined frequency range, means for simultaneously tuning said receiving means and transmitting means, and means initially controlled by said receiving means for rendering said transmitter operable to produce a relatively strong signal automatically in response to reception of a signal by said receiving means.

4. Apparatus as recited in claim 3 further characterized by means for protecting said receiver from the relatively strong signal produced by said transmitter.

5. A transponder comprising a receiver and a normally quiescent transmitter, means for simultaneously and cyclically tuning said receiver and transmitter through a given frequency range, and means for rendering said transmitter operative to produce an effective signal automatically in response to reception of a signal by said receiver when said received signal differs by a predetermined amount from the frequency to which said transmitter is tuned.

References Cited in the file of this patent

UNITED STATES PATENTS

| | | |
|---|---|---|
| 2,209,273 | Hills | July 23, 1940 |
| 2,490,808 | Hoffman | Dec. 13, 1949 |